United States Patent [19]
Gmeiner

[11] Patent Number: 5,833,363
[45] Date of Patent: Nov. 10, 1998

[54] DEVICE FOR MIXING AND DEGASSING A FREE-FLOWING COMPOUND

[75] Inventor: Paul Gmeiner, Lieli, Switzerland

[73] Assignee: Micafil Vakuumtechnik AG, Zurich, Switzerland

[21] Appl. No.: 855,984

[22] Filed: May 14, 1997

[30] Foreign Application Priority Data

Jun. 25, 1996 [DE] Germany .......................... 196 25 208.3

[51] Int. Cl.⁶ .............................. B01F 13/06; B01F 15/02
[52] U.S. Cl. ........................ 366/139; 366/147; 366/153.1; 366/155.1; 366/172.2; 366/314; 366/325.4; 96/157; 96/199; 96/214
[58] Field of Search ............................ 366/64–67, 96–98, 366/102–104, 139, 144, 145, 147, 153.1, 154.1, 155.1, 168.1, 171.1, 172.1, 172.2, 173.1, 173.2, 174.1, 175.2, 292, 302, 314, 325.1, 325.4; 425/203; 96/157, 194, 197–199, 208, 214

[56] References Cited

U.S. PATENT DOCUMENTS

| | | | |
|---|---|---|---|
| 2,908,652 | 10/1959 | Forrester | 96/194 X |
| 5,152,212 | 10/1992 | Chauveau | 366/139 X |
| 5,332,423 | 7/1994 | Gisko et al. | 96/157 X |

FOREIGN PATENT DOCUMENTS

| | | |
|---|---|---|
| 0267025 | 5/1988 | European Pat. Off. . |
| 0674928A1 | 10/1995 | European Pat. Off. . |
| 3241108C2 | 2/1992 | Germany . |
| 9115504 U | 4/1992 | Germany . |
| 655857 | 5/1986 | Switzerland . |
| 662288 | 9/1987 | Switzerland . |

*Primary Examiner*—Charles E. Cooley
*Attorney, Agent, or Firm*—Burns, Doane, Swecker & Mathis, L.L.P.

[57] ABSTRACT

The device serves for mixing and degassing a free-flowing compound (5), in particular a casting resin containing filler. The device has an evacuable container (1, 6) of cylindrical design, the container axis (2) of which is aligned essentially in the vertical direction. Provided in the interior of the container is a rotatable plate (13), fastened on an axially guided shaft (12), for distributing compound (5) fed into the container (1, 6), as well as a thin-layer degassing system (14) which can be heated and cooled and degasses the compound (5) fed by the distributing plate (13). A stirrer homogenizes the degassed compound collected in the interior of the container. The thin-layer degassing system (14) occupies the major part of the space present between the shaft (12) and the wall of the container (1, 6). The stirrer has stirring arms (19, 20), which are fastened to the distributing plate (13) and are led into the bottom region of the container (1, 6) and which engage behind the thin-layer degassing system (14) on that side facing away from the distributing plate (13). The device has a high throughput of compound and, given suitable level control, can be operated with feed through.

11 Claims, 3 Drawing Sheets

DEVICE FOR MIXING AND DEGASSING A FREE-FLOWING COMPOUND

BACKGROUND OF THE INVENTION

1. Field of the Invention

The starting point of the invention is a device for mixing and degassing a free-flowing compound.

Such a device is used for preparing a free-flowing compound directly before the compound is cast into molds in a casting apparatus. In this device, the compound is effectively degassed and thoroughly mixed. Undesired gas inclusions in the compound to be cast, and demixing of the compound, for example sedimentation in a casting resin containing filler, are thus avoided.

2. Discussion of background

A mixing and degassing device of the type mentioned at the beginning is described in CH-A5 655 857. This device has an evacuable container of cylindrical design, whose container axis is aligned essentially in the horizontal direction. Arranged in the container is a rotatable plate, which is fastened on an axially guided shaft and directs compound which is fed into the container to a thin-layer degassing system which can be heated and cooled and is predominantly arranged in the region of the outer surface of the container. Compound degassed by this system is thoroughly mixed with the aid of a stirring element of vane-shaped design which is fastened to the shaft. Since the degassing of the compound takes place only on the plate and in the outer region of the container, the device needs a relatively long period for the preparation of the compound.

SUMMARY OF THE INVENTION

Accordingly, one object of the invention, is to provide a device of the type mentioned at the beginning which is distinguished by a high throughput of compound and which can be operated virtually without maintenance over long time periods.

In the case of the mixing and degassing device according to the invention, the thin-layer degassing system occupies the major part of the interior of the container. The throughput of compound can therefore be quite significantly increased, without additional measures being necessary for maintaining the device.

By means of subdividing the thin-layer degassing system into horizontally distributed stages, the efficiency of the device can be increased further. At the same time, the compound running through the device can then be continuously heated or, if appropriate, continuously cooled.

If it is ensured, by means of a suitable level control system that a minimum quantity of degassed and thoroughly mixed compound remains in the container, then the device according to the invention can be operated continuously in feed-through.

Since as a result of a stirrer preferably acting at the container bottom demixing as a result of the deposition of solid particles is avoided, the mixing and degassing device according to the invention is suited in a particularly advantageous way to the preparation of free-flowing casting resin compounds containing a filler.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
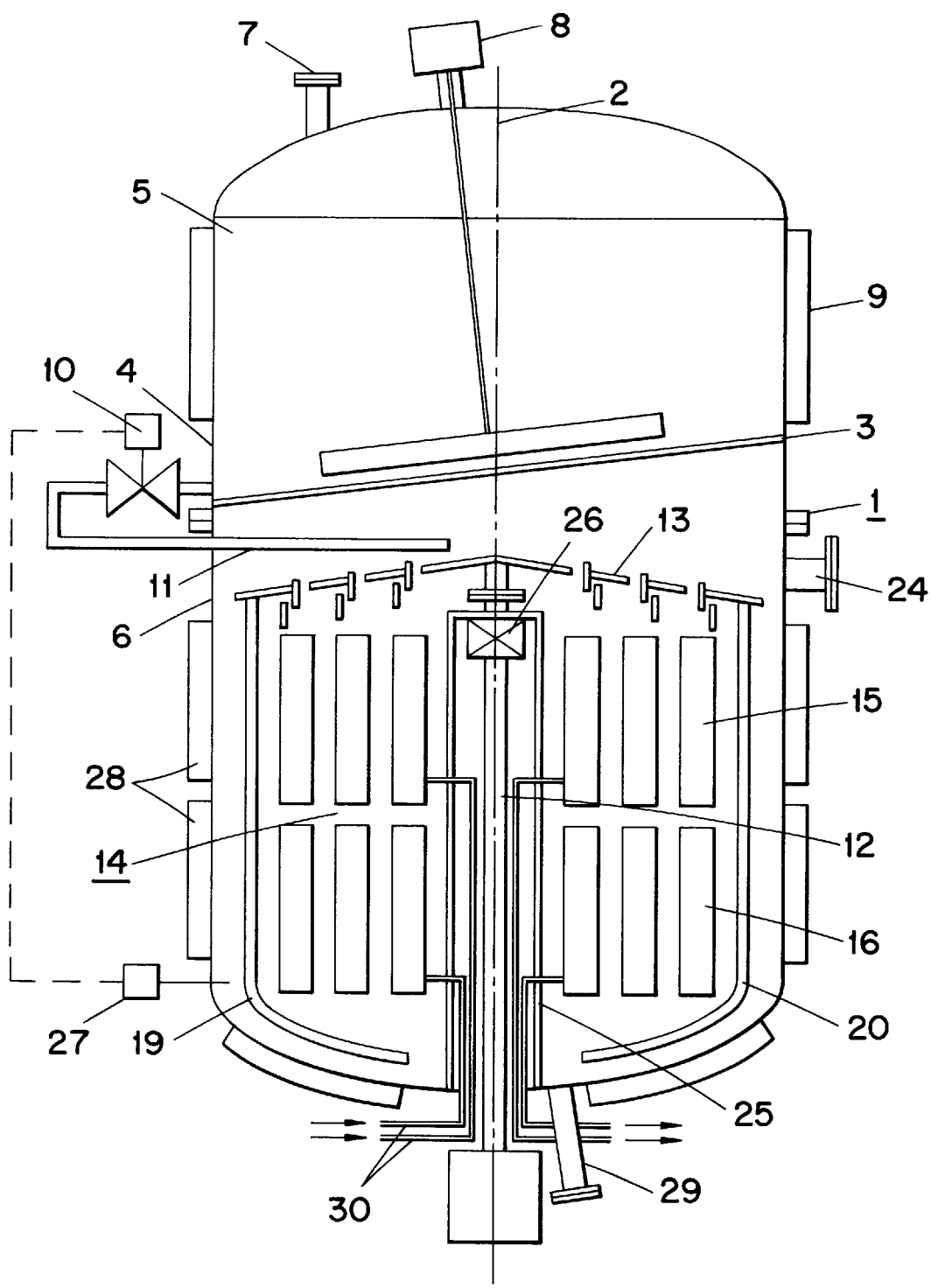
FIG. 1 shows a plan view of an axial section through a container of cylindrical design of a first embodiment of the mixing and degassing device according to the invention, in which a thin-layer degassing system provided in the container is illustrated in schematic form, and in which the container has a partition which is led essentially transversely in relation to the container axis and which subdivides the container into a storage container for compound to be degassed and a container for degassing and mixing this compound.
Figure 2:
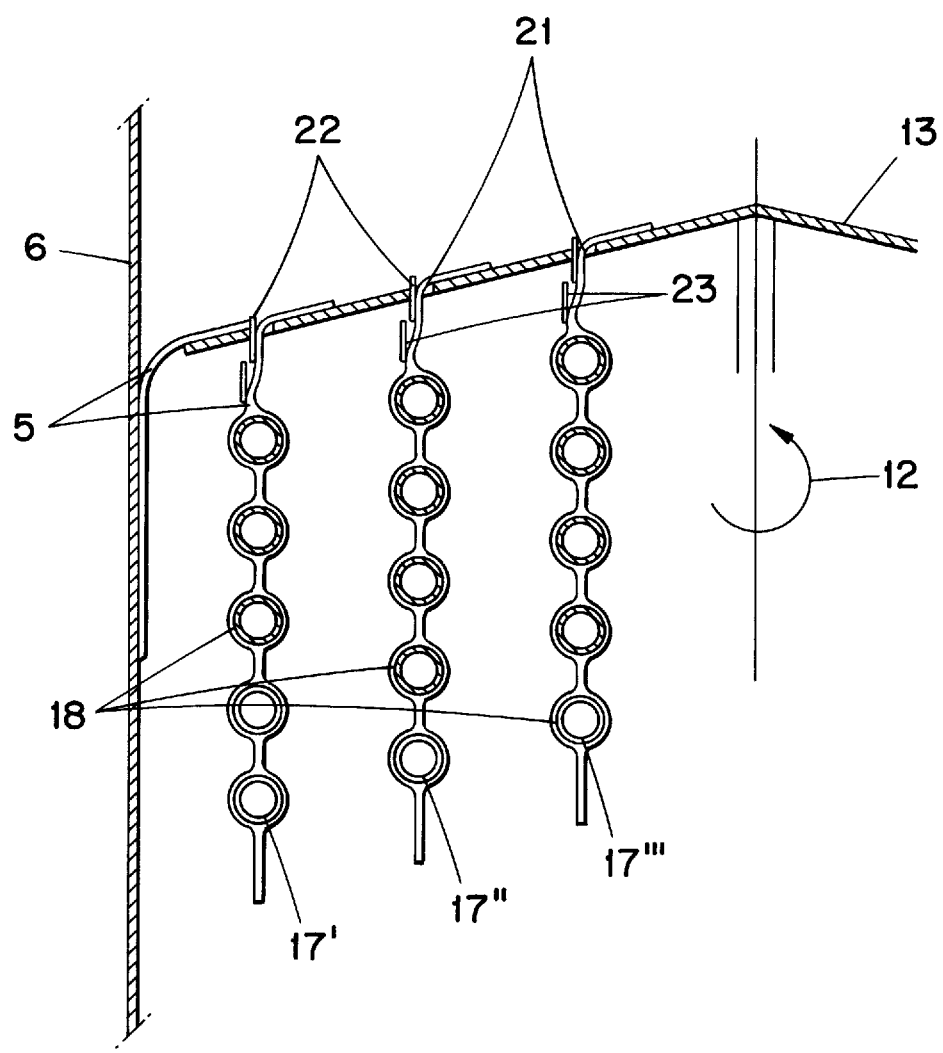
FIG. 2 shows, in an enlarged illustration, a plan view of an axial section through part of a thin-layer degassing system, designed as a spiral, of the device according to FIG. 1.

Referring now to the drawings, wherein like reference numerals designate identical or corresponding parts throughout the several views, the mixing and degassing device illustrated in FIGS. 1 and 2 has an evacuable container 1 of cylindrical design, whose container axis 2 is aligned essentially in the vertical direction. This container is subdivided, by means of a partition 3 which is led essentially transversely in relation to the container axis and inclined slightly with respect to the horizontal, into a storage container 4 for free-flowing compound 5 to be degassed, such as for example a mixture of two liquids which are free of filler or contain filler, for example a reactive filler-containing casting resin compound, and a feed-through container 6 for preparing this compound by degassing and mixing. The compound can be introduced into the storage container 4 via an inlet 7. With the aid of a stirrer 8, the compound introduced into the storage container 4 can be mixed, and can be heated or cooled with the aid of a heating and cooling device 9 which surrounds the storage container 3 like a jacket.

The storage container 4 is arranged above the feed-through container 6. The partition 3 therefore forms the bottom of the storage container 4. Provided at the deepest part of the storage container is an outlet, not designated, which can be connected via a controllable valve 10 to an inlet 11, of tubular design, of the feed-through container 6. The inlet 11 is led with a slight fall in the radial direction until close to the container axis 2.

Arranged under the inlet 11 is a rotatable plate 13 which is fastened to a free end of an axially guided shaft 12. This plate 13 is of essentially conical design. The tip of the cone is located at the free end of the shaft 12, whereas the conical surface forming the surface of the plate 13 extends with a slight fall until close to the inner wall of the feed-through container 6. The plate 13 serves to distribute the compound fed via the inlet 11 into the feed-through container 6.

Arranged underneath the distributing plate 13 is a thin-layer degassing system 14, which can be heated and cooled and is installed in a fixed manner in the feed-through container 6. This thin-layer degassing system 14 has two stages 15, 16 which are arranged horizontally one above the other, of which the upper stage 15, arranged below the distributing plate, can be heated, and the lower stage 16, arranged under the upper stage 15, is designed such that it can be heated and cooled. The stages 15 and 16, respectively, can each contain heating elements or heating and cooling elements, aligned in the axial direction and in each case designed as a column having surface-enlarging elements, for example formed from a ceramic. However, as can be seen from FIG. 2, they can also have in a coaxial arrangement two, three or even more heating spirals or heating and cooling spirals 17', 17", 17'" with pipe turns 18 which are spaced apart from one another in the axial direction. The thin-layer degassing system 14 thus occupies the major part of the space present between the shaft 12 and the wall of the feed-through container 6.

Fastened at the rim of the distributing plate 13 are two stirring arms 19, 20, which are led between the thin-layer degassing system 14 and the inner wall of the feed-through container 6, the said stirring arms being led into the bottom region of the feed-through container 5 and engaging behind the thin-layer degassing system 14 on that side facing away from the distributing plate 13. Instead of the two stirring arms 19, 20, only a single stirring arm may be provided. If appropriate, however, it is also possible for three or more stirring arms to be provided, preferably arranged distributed uniformly in the circumferential direction.

As can be seen in particular from FIG. 2, the distributing plate 13 has slots 21 which predominantly lead in the circumferential direction, and which in each case are bounded, on the side facing away from the shaft 12, by a collar 22 projecting beyond the surface of the distributing plate 13. Underneath each collar 22 there is a sheet metal guide 23 which is led to the heating spirals or heating and cooling spirals 17', 17", 17'".

Above the distributing plate 13, a vacuum connection 24 opens into the feed-through container 6. Fitted to the underside of the feed-through container 6 is a connecting piece 25 which is led axially symmetrically into the container, and whose upper end, which is led into the container, carries a vacuum-tight bushing 26 for the shaft 12. Arranged in the lower part of the feed-through container 6 is a sensor 27 which detects the level of the degassed compound and acts on the controllable valve 10.

Heating and cooling elements serving to heat and cool the feed-through container 6 are designated by the reference symbols 28. Arranged at the bottom of the feed-through container 6 are an outlet 29 for degassed and thoroughly mixed compound as well as heating means and coolant connections 30 which are led via the connecting piece 25 to the elements of the thin-layer degassing system 14.

The mode of operation of this mixing and degassing device is as follows:

Compound 5 which is stored in the storage container 4 and if appropriate cooled is heated by means of the heating and cooling device 9 to a temperature at which it exhibits a relatively low viscosity and is very free-flowing. The stirrer 8 in this case homogenizes the compound 5.

The homogenized compound 5 is fed via the open valve 10 and the inlet 11 into the feed-through container 6, which is connected via the vacuum connection 24 to a vacuum source. Compound 5 emerging from the inlet 11 impinges on the distributing plate 13 in the region of the tip. The temperature of the compound and correspondingly also of the interior of the feed-through container 6 are set in such a way that the compound 5 flows in the form of thin layers from the inside to the outside over the surface of the distributing plate 13. Here, the shaft 12 rotates the distributing plate 13. Therefore—as can be seen from FIG. 2—the compound is distributed over the entire surface of the plate 13. Since the collars 22 exert a guiding function, the major part of the compound 5 flows through the slots 21 and, with the aid of the sheet metal guides 23 is fed from above to the heating spirals 17', 17", 17'" of the upper stage 15 of the thin-layer degassing system 14. The compound 5 flows around the uppermost pipe turns 18 from top to bottom in the form of a thin layer and subsequently flows to the pipe turn lying below it. The remaining smaller part of the compound 5 flows over the rim of the distributing plate 13 to the inner wall of the feed-through container 6 and flows downward there in the form of a thin layer.

The heating spirals 17', 17", 17'" and the inner wall of the feed-through container 5 are kept at a temperature which is just sufficient to ensure flow in a thin layer. During the flow in thin layers, the compound 5 is effectively degassed. The degassed compound can be still further degassed at the heating and cooling spirals of the lower stage 16.

The degassed compound is collected in the lower part of the feed-through container 6, homogenized with the stirring arms 19, 20, primarily in the bottom region of the feed-through container 5, and subsequently fed as required via the outlet 29 to a casting apparatus. The heating and cooling spirals of the lower stage 16 of the thin-layer degassing system 14 can be cooled if required, in order in this way to prolong the pot life of the compound 5 by cooling. Since virtually the entire interior of the feed-through container 6 is filled with elements of the thin-layer degassing system 14, a large quantity of compound can be degassed in a short time span.

The sensor 27 ensures that the level of the degassed compound collected in the feed-through container 6 moves within a predefined level interval during the operation of the mixing and degassing device. Deviations from this interval are compensated by controlling, with the aid of the controllable valve 10, the quantity of compound 5 fed into the feed-through container 6. The mixing and degassing device can therefore be operated continuously in feed-through.

The connecting piece 25 guiding the shaft 12 is led sufficiently far into the interior of the feed-through container 6 that its end, bearing the vacuum tight bushing 26 of the shaft 12, is always located above the level of the degassed compound. This ensures that the vacuum tight bushing 26 does not come into contact with the compound, which is generally chemically aggressive.

The stirring arms 19, 20 do not necessarily have to be fitted at the rim of the distributing plate 13 and guided between the thin-layer degassing system 14 and the container wall. As can be seen from the embodiment according to FIG. 3, the stirring arms 19, 20 can also be fastened in the central region of the distributing plate 13 and led between the shaft 12 or the connecting piece 25 and the thin-layer degassing system 14. What is important above all is that the stirring arms 19, 20 are led as far as into the bottom region and engage behind the thin-layer degassing system 14, since then on the one hand the thin-layer degassing system can occupy the major part of the space between shaft 12 or connecting piece 25 and container wall, and since then on the other hand sedimentation of the free-flowing compound is avoided with great certainty. Since in the case of the exemplary embodiment according to FIG. 3 the stirring arms 19, 20 are fastened to the distributing plate 13 close to the shaft, during the operation of the mixing and degassing device according to FIG. 3 lower mechanical forces act on the distributing plate 13 than in the case of the device according to FIG. 1.

Figure 3:
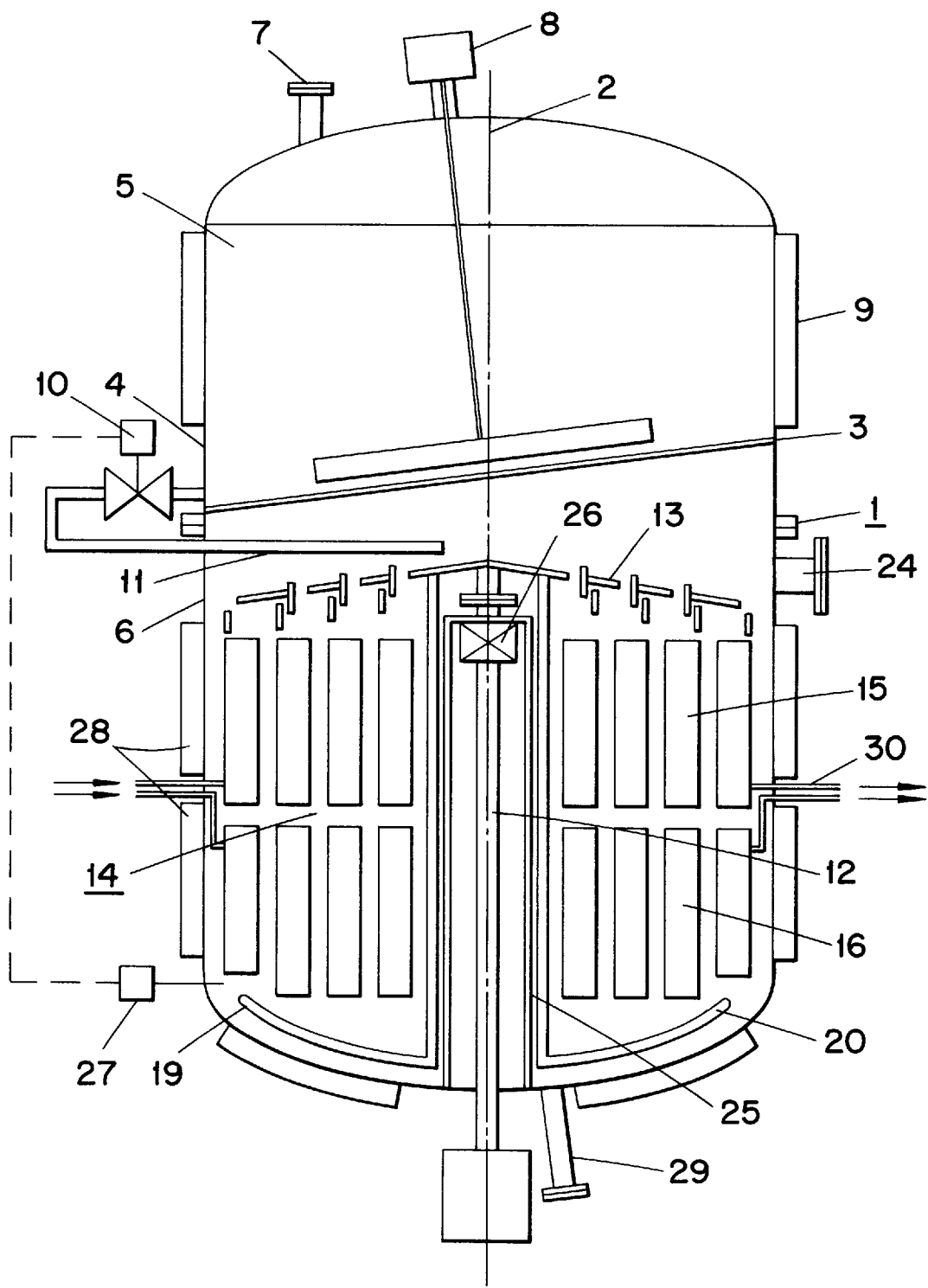
FIG. 3 shows a plan view of an axial section through a container of cylindrical design of a second embodiment, slightly modified with respect to the first, of the mixing and degassing device according to the invention.

In the case of the embodiment according to FIG. 3, the thin-layer degassing system 14 is advantageously heated or cooled from the outside via the heating means and coolant connections 30. Alternatively, it is also possible to fasten the stirring arms 19, 20 to the distributing plate 13 about half way between the center and the rim. In this case, the stirring arms 19, 20 are led between heating elements, spaced apart radially from one another, to the bottom region of the feed-through container 5. The engagement behind the thin-layer degassing system 14 is achieved by designing the stirring arms 19, 20 as anchors. The heating means and coolant connections 30 then feed heating means or coolant from the inside—corresponding to the embodiment according to FIG. 1—and also from the outside—corresponding to the embodiment according to FIG. 3.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for mixing and degassing a free-flowing compound comprising:
   an evacuable cylindrical container having a wall defining a space in said container, a bottom section, a container axis which is aligned essentially in the vertical direction, an inlet leading into said container for introducing said compound into said container and an outlet leading out of said container for degassed and thoroughly mixed compound;
   an axially guided shaft;
   a rotatable distributing plate fastened on said axially guided shaft for distributing said compound when fed into said container;
   a rotatable stirring element fastened to said distributing plate for rotation in the degassed compound and having at least one stirring arm;
   means for degassing said compound including a thin-layer degassing system configured to be heated and cooled, said distributing plate extending between said guided shaft above a substantial portion of said thin-layer degassing system to a point adjacent said wall, said means for degassing substantially degassing said compound when fed by said distributing plate to said thin-layer degassing system, said space including a bottom portion space between said shaft and said wall, said thin-layer degassing system occupying a major part of said bottom portion space; and
   wherein said at least one stirring arm includes a portion in said bottom section of said container which engages below said thin-layer degassing system on a side of said thin-layer degassing system opposite said distributing plate.

2. The device as claimed in claim 1, wherein said distributing plate further comprises a rim, said at least one stirring arm is fitted at said rim and is led between said thin-layer degassing system and said container wall.

3. The device as claimed in claim 1, wherein said at least one stirring arm is fitted in a central region of said distributing plate and is led between said shaft and said thin-layer degassing system.

4. The device as claimed in claim 1, wherein said distributing plate further comprises slots which are predominantly led in a circumferential direction.

5. The device as claimed in claim 4, wherein said distributing plate further comprises a surface, said at least one of said slots is bounded, on a side away from said shaft, by a collar projecting beyond said surface of said distributing plate.

6. The device as claimed in claim 1, wherein said thin-layer degassing system comprises at least an upper stage and a lower stage, said upper stage arranged below said distributing plate and configured to be heated, said lower stage arranged under said upper stage and configured to be heated and cooled.

7. The device as claimed in claim 6, wherein at least one of said upper and lower stages is oriented in the axial direction and comprises columnar elements selected from the group consisting of heating elements and heating and cooling elements.

8. The device as claimed in claim 6, wherein at least one of said stages comprises at least two spirals selected from the group consisting of heating spirals and heating and cooling spirals, said at least two spirals being coaxial and each said two spirals comprising pipe turns spaced apart from one another in the axial direction.

9. The device as claimed in claim 1, further comprising a connecting piece fitted to said container in said container bottom section and axially symmetrically led into said container, said connecting piece having an upper end carrying a vacuum-tight bushing surrounding said shaft.

10. The device as claimed in claim 1, further comprising a valve controlling the flow through said inlet, and wherein said container bottom section comprises a sensor in communication with said valve and positioned to register the level of said degassed compound.

11. The device as claimed in claim 1, wherein said container further comprises a partition above said inlet which is substantially transversely led in relation to said container axis and which divides said container, a portion of said container above said partition forming a storage container for the compound to be degassed.

* * * * *